United States Patent [19]
Yamanishi et al.

[11] Patent Number: 5,544,913
[45] Date of Patent: Aug. 13, 1996

[54] PROTECTIVE DEVICE FOR PROTECTING VEHICLE OCCUPANT

[75] Inventors: Takahiro Yamanishi; Hiroaki Fujii; Nobuya Osada, all of Shiga, Japan

[73] Assignee: Takata Corporation, Tokyo, Japan

[21] Appl. No.: 511,363

[22] Filed: Aug. 4, 1995

[51] Int. Cl.⁶ ................................. B60R 21/22
[52] U.S. Cl. ...................... 280/730.2; 280/751
[58] Field of Search .................. 280/730.2, 732, 280/748, 751, 752

[56] References Cited

U.S. PATENT DOCUMENTS 3,638,992  2/1972  Forshee ........................ 280/748
5,141,279  8/1992  Weller ........................... 280/751
5,308,112  5/1994  Hill et al. ..................... 280/730.2
5,447,326  9/1995  Laske et al. .................. 280/730.2

Primary Examiner—Paul N. Dickson
Attorney, Agent, or Firm—Kanesaka & Takeuchi

[57] ABSTRACT

A protective device for protecting a vehicle occupant includes at least one air bag mounted along a compartment-side surface of a side member of the vehicle and being expandable toward a compartment of the vehicle by gas introduced therein, a gas supplying unit for supplying gas into the air bag in a lateral collision of the vehicle, and a trim sheet for the interior of the vehicle covering a compartment-side-side surface of the air bag. The trim sheet is made of stretchable material for allowing the expansion of the bag.

14 Claims, 4 Drawing Sheets

5,544,913

PROTECTIVE DEVICE FOR PROTECTING VEHICLE OCCUPANT

FIELD OF THE INVENTION

The present invention relates to a device for protecting an occupant in a vehicle when the vehicle suffers a lateral collision.

BACKGROUND OF THE INVENTION

In order to prevent an occupant from bumping against a side member in a compartment of a vehicle, for example a door, in a lateral collision, an air bag device may be mounted to the door. When the vehicle suffers a lateral collision, the air bag device against lateral collision starts to deploy an air bag. To detect a lateral collision, sensors mounted to the vehicle sense acceleration in the lateral direction of the vehicle. When the acceleration exceeds a predetermined value, a decision circuit determines that a lateral collision occurs to the vehicle and then supplies a starting current to a gas generator of the air bag device.

In a conventional air bag device against lateral collision, an air bag is covered by a module cover which is broken at the deployment of the air bag so that the air bag is extended toward a compartment of the vehicle.

In the conventional air bag device against lateral collision, since it is necessary to apply pressure for breaking the module cover to the module cover, a gas generator having large capacity must be employed.

OBJECT AND SUMMARY OF THE INVENTION

It is an object of the present invention to provide a protective device for protecting a vehicle occupant which is capable of protecting sufficiently an occupant even with a gas generator having small capacity.

A protective device for protecting a vehicle occupant according to the present invention comprises at least one air bag mounted along a compartment-side surface of a side member of the vehicle and being expandable toward the compartment of the vehicle by gas introduced therein, a gas supplying unit for supplying gas into the air bag in a lateral collision of the vehicle, and a trim sheet for the interior of the vehicle covering a compartment-side surface of the air bag, wherein the trim sheet is made of a stretchable material for allowing the expansion of the bag.

When the vehicle with said protective device suffers a lateral collision, gas from the gas supplying unit is introduced into the air bag so as to deploy the air bag toward the compartment. At this point, the trim sheet stretches correspondingly to the deployment of the air bag.

The air bag is deployed toward the compartment and is laid between the side member such as a door and the vehicle occupant, thereby absorbing the impact applied to the vehicle occupant.

It is preferable that the protective device further comprises a pad between the air bag and the interior cover and the pad is divided into a plurality of pieces to allow the divided pieces to be separated from each other. Therefore, in the deployment of the air bag, the air bag expands toward the compartment, separating the pad pieces.

The gas supplying unit preferably comprises a sensor for detecting a lateral collision, a gas generator operated in response to a detecting signal from the sensor, and a duct for introducing gas generated from the gas generator into the air bag.

The generator supplies gas through the duct having branches so that the gas generated by the single gas generator can be introduced into a plurality of air bags.

DESCRIPTION OF THE PREFERRED EMBODIMENTS

Figure 1:
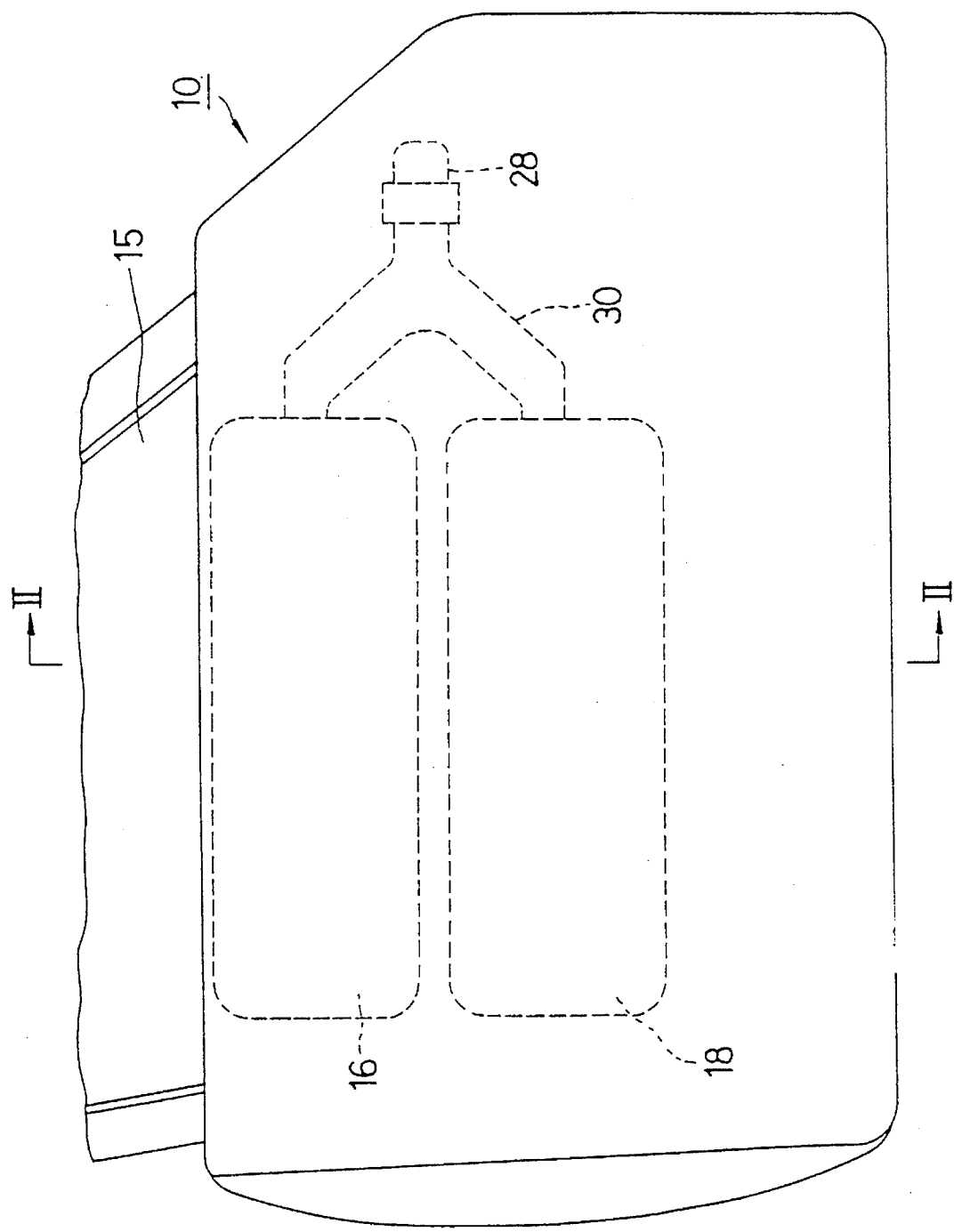
FIG. 1 is a front view of a door provided with a protective device for protecting a vehicle occupant according to an embodiment of the present invention.
Figure 2:
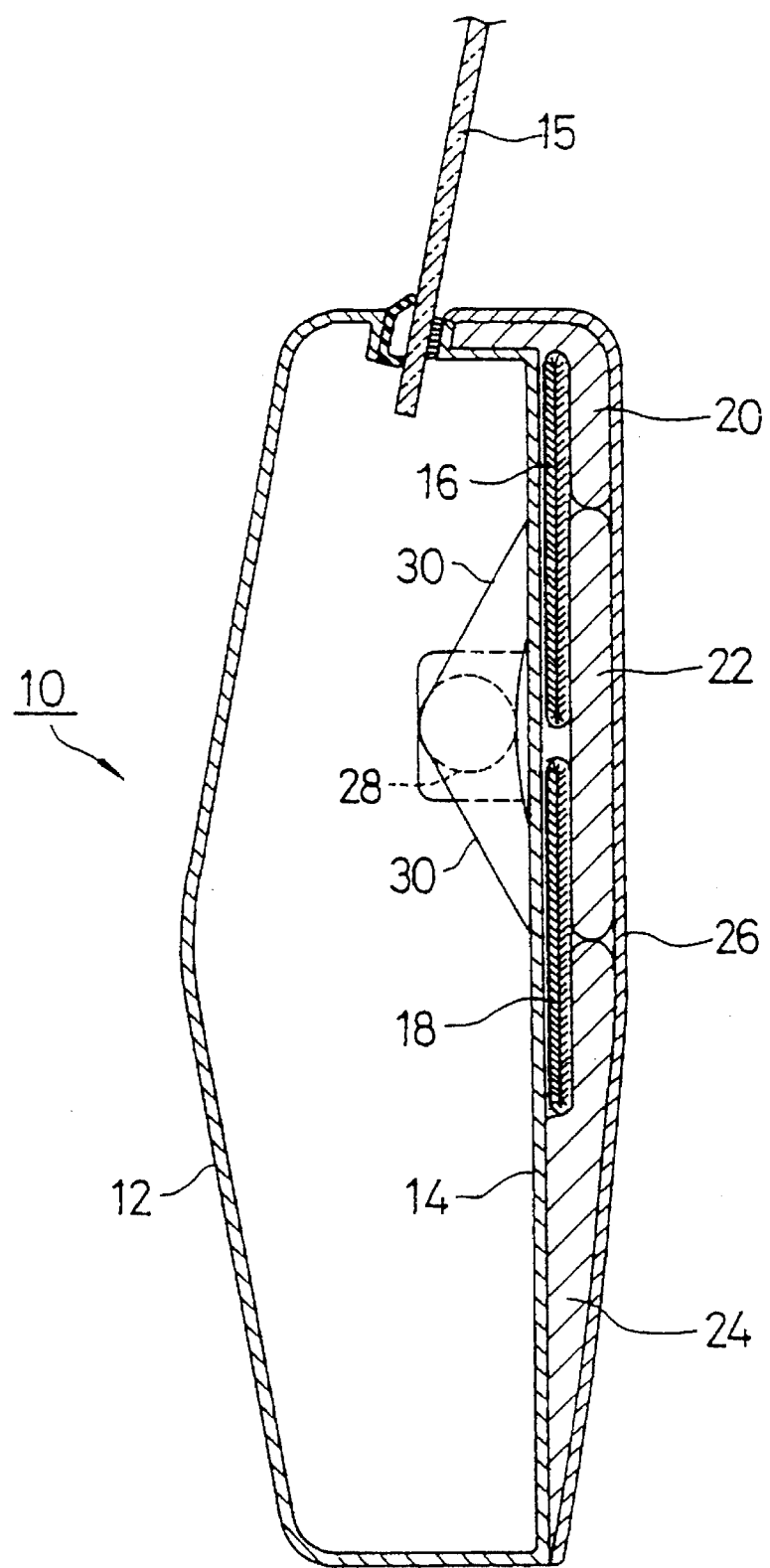
FIG. 2 is a sectional view taken along a line II—II in FIG. 1.

Hereinafter, an embodiment of the present invention will be described in detail with reference to FIGS. 1 through 4.

A door 10 has a main body comprising an outer panel 12 and an inner panel 14 which are made of steel, and window glass 15 which is inserted in the main body to allow the window glass 15 to move up and down from an upper surface of the main body. The door 10 is also provided with air bags 16 and 18 disposed along the surface, facing the compartment, of the inner panel 14. Plate-like pads 20, 22, and 24 made of a soft material are disposed to cover the air bags 16, 18 and such that side-ends of the adjacent pads are in contact with each other.

Figure 3:
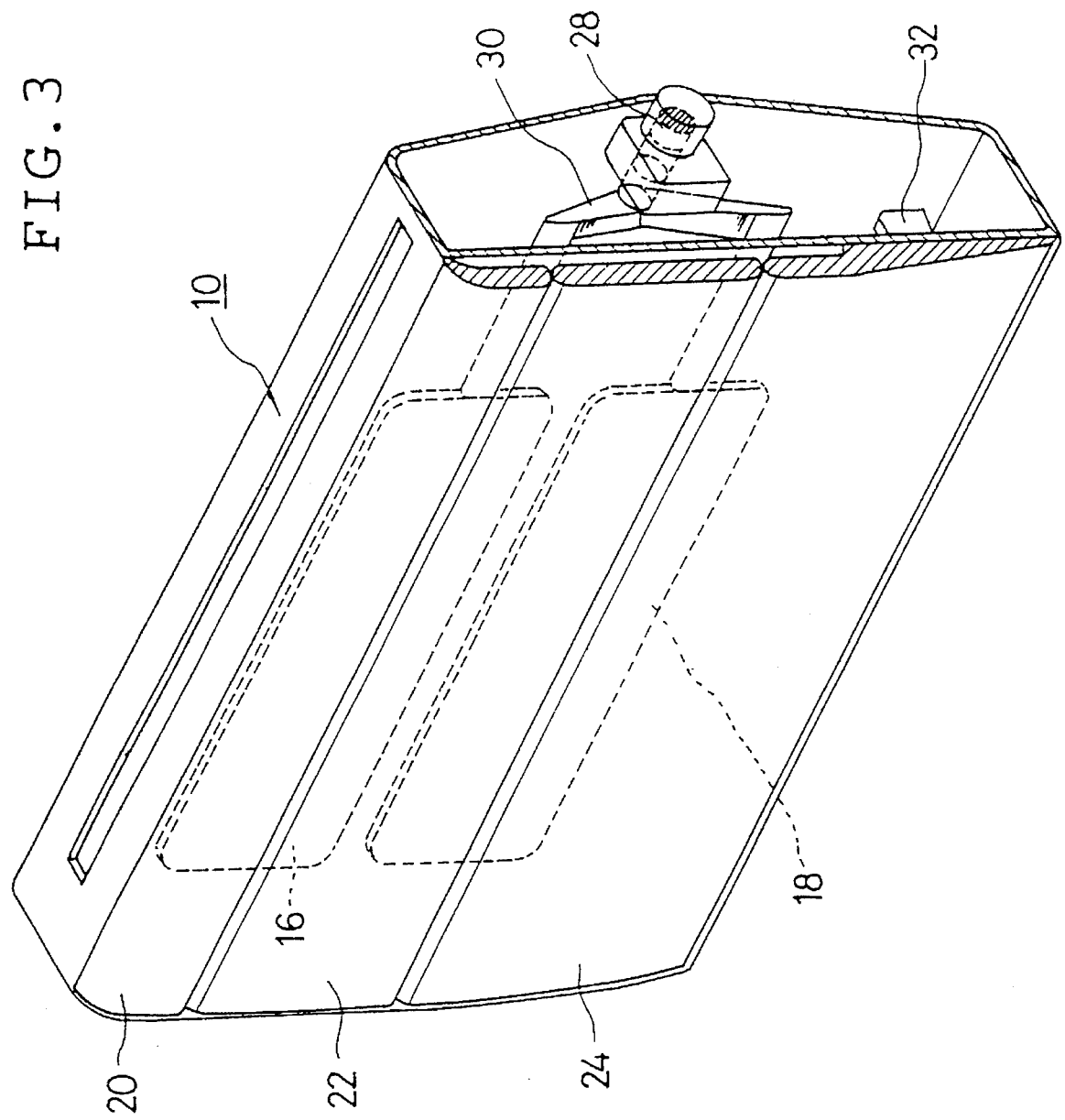
FIG. 3 is a perspective view of the door without its trim sheet for explanation.

As clearly shown in FIG. 3, the air bags 16 and 18 are each formed in a long and narrow shape extending in the longitudinal direction of the vehicle in this embodiment. The pads 20, 22, and 24 also extend in the longitudinal direction of the vehicle. The contact face between the pads 20 and 22 is positioned at the middle of the upper air bag 16 in the vertical direction. The contact face between the pads 22 and 24 is positioned at the middle of the air bag 18 in the vertical direction.

A film-like trim sheet 26 is disposed to cover the pads 20, 22, and 24. The trim sheet 26 is made of a stretchable material so that the trim sheet 26 is stretched when the air bags 16 and 18 are deployed. The pads 20, 22, and 24 are made of a material having a suitable flexibility so that, when the air bags are deployed, the pads 20, 22, and 24 are deformed toward the compartment by the pushing force of the air bags.

A gas generator 28 and a duct 30 for introducing gas generated by the gas generator 28 to the air bags 16 and 18 are disposed inside of the inner panel 14.

The door 10 is provided with an acceleration sensor 32 for detecting that a lateral collision occurs to the vehicle.

When the door 10 structured above is bumped in the lateral direction by another vehicle and the acceleration detected by the acceleration sensor 32 thereby exceeds the predetermined value, the gas generator 28 operates. The gas generator 28 is provided with an ignitor and propellant for generating gas which is ignited by the ignitor. The propellant starts reaction by applying current to the ignitor, thereby generating rapidly a lot of gas. The gas is introduced into the air bags 16 and 18 through the duct 30 so as to extend the air bags 16 and 18 toward the compartment.

Figure 4:
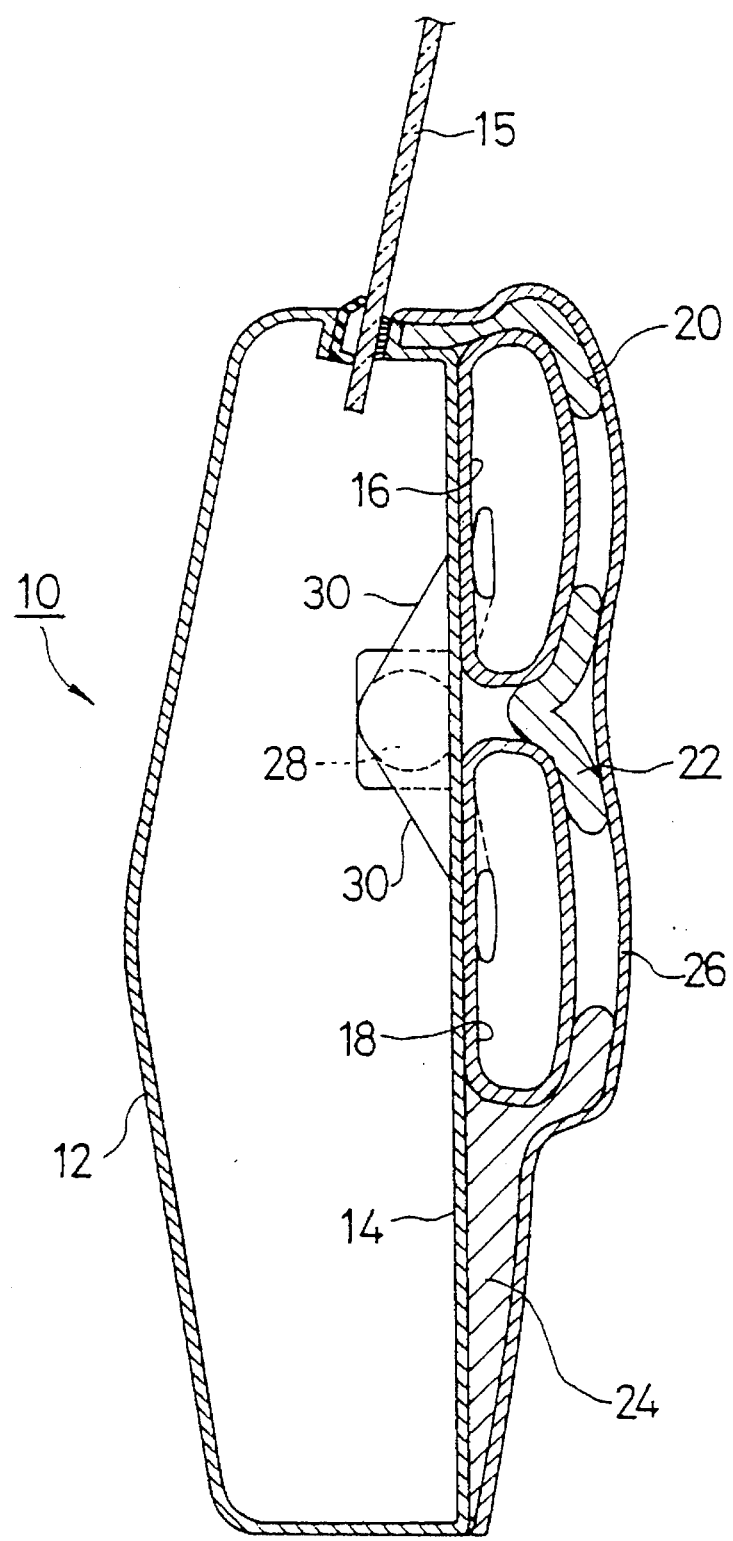
FIG. 4 is a sectional view of the door showing the protective device according to the embodiment to explain the operation of the protective device.

As shown in FIG. 4, the bags 16 and 18 separate the pads 20, 22, and 24 from each other and extend them toward the compartment while deforming them. When the vehicle occupant bumps against the door 10 having the air bags 16 and 18 deployed as mentioned above, the air bags 16 and 18 act as cushions thereby absorbing impact against the occupant.

The protective device for the vehicle occupant according to this embodiment does not have a module cover which is broken and opened toward the compartment, differing from the conventional air bag device against lateral collision. Therefore, it is unnecessary to apply sufficient pressure for breaking the module cover to the air bags. As a result, the protective device can sufficiently protect the occupant even with the gas generator 28 having a small capacity.

In this embodiment, the protective device is designed to supply gas from the single gas generator 28 into the two air bags 16 and 18 through the duct 30, that is, the only one gas generator can deploy the two air bags, thereby decreasing the number of gas generators to be disposed. It should be noted that the single gas generator may deploy one air bag or three or more air bags.

Though the protective device is mounted to the door in the above embodiment, in a case where a side member of a seat comprises a side wall of the vehicle body, such as a case of a rear seat of a two-door type vehicle, the protective device of the present invention may be mounted to the side wall.

As mentioned above, the protective device of the present invention is capable of sufficiently protect the vehicle occupant against a lateral collision even with the gas generator having a small capacity. Furthermore, it can decrease the number of gas generators to be disposed.

What we claim is:

1. A protective device for protecting a vehicle occupant comprising:

at least one air bag mounted along a compartment-side surface of a side member of a vehicle and being expandable toward a compartment of the vehicle by gas introduced therein, a gas supply unit for supplying gas into said at least one air bag in a lateral collision of the vehicle, a trim sheet for an interior of the vehicle covering the compartment-side surface of said at least one air bag, said trim sheet being made of a stretchable material for allowing expansion of said at least one air bag, and a pad situated between said at least one air bag and said trim sheet, said pad being divided into a plurality of pieces to allow the divided pieces to be separated from each other.

2. A protective device as claimed in claim 1, wherein said at least one air bag and said pad extend in a longitudinal direction of the vehicle.

3. A protective device as claimed in claim 2, wherein said pad comprises a plurality of pad pieces disposed in parallel in the longitudinal direction of the vehicle.

4. A protective device as claimed in claim 3, wherein a lower end of an upper one of said pad pieces is in contact with an upper end of a lower one of said pad pieces.

5. A protective device as claimed in claim 4, wherein a contact face between said pad pieces is positioned at a middle and a side of the at least one air bag in a vertical direction.

6. A protective device as claimed in claim 5, wherein said upper and lower pad pieces are deformed toward the compartment by pushing force of said at least one air bag disposed behind them and are then separated from each other upward and downward when said at least one air bag expands, and said expanded at least one air bag covering a space between said upper and lower pad pieces.

7. A protective device as claimed in claim 2, wherein said protective device is provided with a plurality of said at least one air bag disposed in parallel with each other in longitudinal direction of the vehicle.

8. A protective device as claimed in claim 7, wherein said gas supplying unit comprises a sensor for detecting a lateral collision, a gas generator operated in response to a detecting signal from said sensor, and a duct for introducing gas generated from said gas generator into said plurality of air bags.

9. A protective device as claimed in claim 8, wherein said duct has a plurality of branches so that the gas is introduced into said plurality of air bags through said plurality of branches of said duct, respectively.

10. A protective device as claimed in claim 1, wherein said pad has a flexibility so that said pad is deformed toward the compartment by pushing force of said at least one air bag.

11. A protective deice as claimed in claim 1, wherein said gas supplying unit comprises a sensor for detecting a lateral collision, a gas generator operated in response to a detecting signal from said sensor, and a duct for introducing gas generated from said generator into said at least one air bag.

12. A protective device for protecting a vehicle occupant comprising:

at least one air bag mounted along a compartment-side surface of a side member of a vehicle and being expandable toward a compartment of the vehicle by a gas introduced therein, air bags disposed in parallel with each other a gas supplying unit for supplying gas into said at least one air bag in a lateral collision of the vehicle, and a gas supplying unit for supplying gas into said at least one air bag in a lateral collision of the vehicle, and a stretchable trim sheet for an interior of the vehicle fixed to the side member of the vehicle, said trim sheet covering the compartment-side surface of said at least one air bag and being made of a stretchable material so that in the lateral collision of the vehicle, said trim sheet expands, without separating from the side member of the vehicle, toward the interior of the vehicle by expansion of said at least one air bag to thereby allow the air bag to inflate easily.

13. A protective device as claimed in claim 12, further comprising a pad between said at least one air bag and said trim sheet, said pad being divided into a plurality of pieces to allow the divided pieces to be separated from each other.

14. A protective device as claimed in claim 12, wherein said trim sheet covers the side members over the least one air bag.

* * * * *